United States Patent [19]

Takahashi et al.

[11] 4,180,206

[45] Dec. 25, 1979

[54] MERCHANDISE SALES CONTROL SYSTEM

[75] Inventors: Yasuyoshi Takahashi; Shigeo Sekiguchi; Teruyoshi Sato, all of Tagata, Japan

[73] Assignee: Tokyo Electric Co., Ltd., Tokyo, Japan

[21] Appl. No.: 811,124

[22] Filed: Jun. 28, 1977

[30] Foreign Application Priority Data

Jun. 30, 1976 [JP] Japan ................................ 51-78350

[51] Int. Cl.[2] ...................... G06K 15/00; G06K 15/02

[52] U.S. Cl. .................................... 235/419; 235/378

[58] Field of Search ............... 235/378, 383, 385, 375, 235/419; 340/149 A, 152; 364/404, 405

[56] References Cited

U.S. PATENT DOCUMENTS

| | | | |
|---|---|---|---|
| 2,919,851 | 1/1960 | Otis | 235/383 |
| 3,235,713 | 2/1966 | Stern | 235/383 |
| 3,851,151 | 11/1974 | Stambera | 235/375 |

*Primary Examiner*—Daryl W. Cook

*Attorney, Agent, or Firm*—Oblon, Fisher, Spivak, McClelland & Maier

[57] ABSTRACT

A merchandise sales control system having a plurality of memory cassettes each provided with a memory for storing unit-price setting data or sales data, wherein a unit-price writing device presets commodity unit prices in the memory cassettes which are thereafter set in a plurality of electronic cash registers respectively and thereby the commodity unit prices are automatically read out according to the commodity code and wherein the memory cassettes are set in a totalling device to obtain gross sales total and the like.

10 Claims, 9 Drawing Figures

MERCHANDISE SALES CONTROL SYSTEM

BACKGROUND OF THE INVENTION

The present invention relates to a merchandise sales control system and, more particularly, to a merchandise sales control system that can preset the unit prices of commodities in a plurality of electronic cash registers provided independently of one another and, in addition, can obtain totalled data such as gross sales of the commodities.

In registering sale proceeds in a cash register, it has been very troublesome and liable to error to depress amount keys every time when each commodity was sold, or to depress a multiplication key and numeral keys if a plurality of commodities were sold, and in addition to depress commodity keys for each transaction. For this reason, therefore, a cash register with a unit-price memory has been in practical use, in which the unit price is previously preset for each commodity and thereby registration is made simply by depressing a commodity key corresponding to the commodity sold. In this case, the operation of unit-price presetting is made for each commodity by depressing numeral keys corresponding to amount keys and then by depressing the commodity key; and the data once preset are kept stored in the memory unless they are intentionally erased. Therefore, the unit prices of such commodities as medicines stable in price may be used for a long time if once preset; however, in the case of such commodities as perishable foodstuffs subject to daily price change, the unit prices for the day must be preset in each cash register before work is started, and as a result, the time required for unit-price presetting is inevitably increased. In addition, prices are changed in many cases, for instance, when commodities are purchased for stock according to the judgement of the branch office itself in addition to the instructions from the head office or the control center, when commodities are on sale at a discount or at special prices on a special bargain day or when those discount prices are returned to the normal prices, when commodities left unsold are on sale at a discount or when those discount prices are returned to the normal prices, and when strategic prices are adopted according to the judgement of the branch office itself in rivalry with the other dealers in the same commercial district. Accordingly, it can be said that the frequency of unit-price presetting is very high and therefore so much increased are the possibility of making mistakes in inputting operations and the frequency of performing troublesome checking operations.

There is also provided a system in which each cash register is connected to a computer or the like installed in the control center thereby enabling omission of the unit-price presetting operation for each individual cash register. Such a system, however, is inevitably large in scale and very expensive and, in addition, cannot perform such small-scale operations as presetting of unit prices for each register of each branch or each shop; therefore, the unit prices of commodities liable to price changes must be preset in each cash register by operating its own keyboard.

It is also very time-consuming and laborious to carry out, after registration, the data-totalling or -collecting operation for each cash register or collectively for all the cash registers. In view of this fact, there has been provided a system in which, after completion of the work for the day, a data-totalizer or -collector is connected to the cash registers one by one for data-totalling or -collection. In such a system, however, the data collection cannot be performed at a time and therefore is also accompanied by some troubles.

SUMMARY OF THE INVENTION

It is an object of the present invention to provide a merchandise sales control system, in which the operational contents of electronic cash registers installed independently of one another are stored in memory cassettes to facilitate data collection or totalization.

It is another object of the present invention to provide a merchandise sales control system, which can perform not only data collection or totalization but also unit-price presetting by the use of memory cassettes for simplification of registration operations.

It is still another object of the present invention to provide a merchandise sales control system which can perform both unit-price presetting and sales totalization for electronic cash registers installed independently of one another, by the use of a simple device without using an on-line system.

According to the present invention, there is provided a merchandise sales control system which comprises a plurality of memory cassettes each having at least a recording section composed of a unit-price setting section and a sales data section, a unit-price writing device able to removably connect to the memory cassettes and to preset a number of commodity unit prices in the unit-price setting section of each of the memory cassettes, a plurality of electronic cash registers able to removably connect to the memory cassettes, and a totalling device able to removably connect to the memory cassettes, wherein the memory cassettes are connected to the unit-price writing device which presets a number of commodity unit prices in the unit-price setting section of the memory cassettes, then the memory cassettes are connected to the electronic cash registers respectively to perform sales registration so that sales data based on the commodity unit prices stored in the unit-price setting section are registered in the sales data section, and then the memory cassettes in which the sales data are registered are removed from the electronic cash registers and are connected to the totalling device which totals the sales data stored in the electronic cash registers.

DESCRIPTION OF THE PREFERRED EMBODIMENTS

Figure 1:
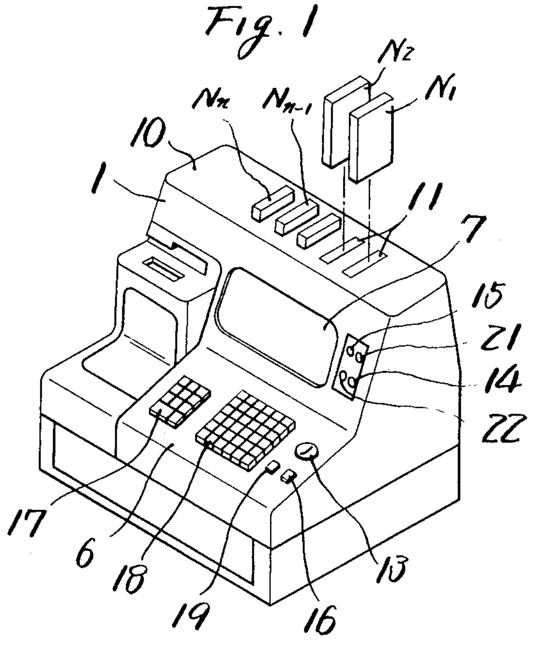
FIG. 1 is a perspective view of a unit-price-writing and sales-totalling device and memory cassettes according to the present invention, showing how the unit prices are written or how the data are totalized or collected.
Figure 2:
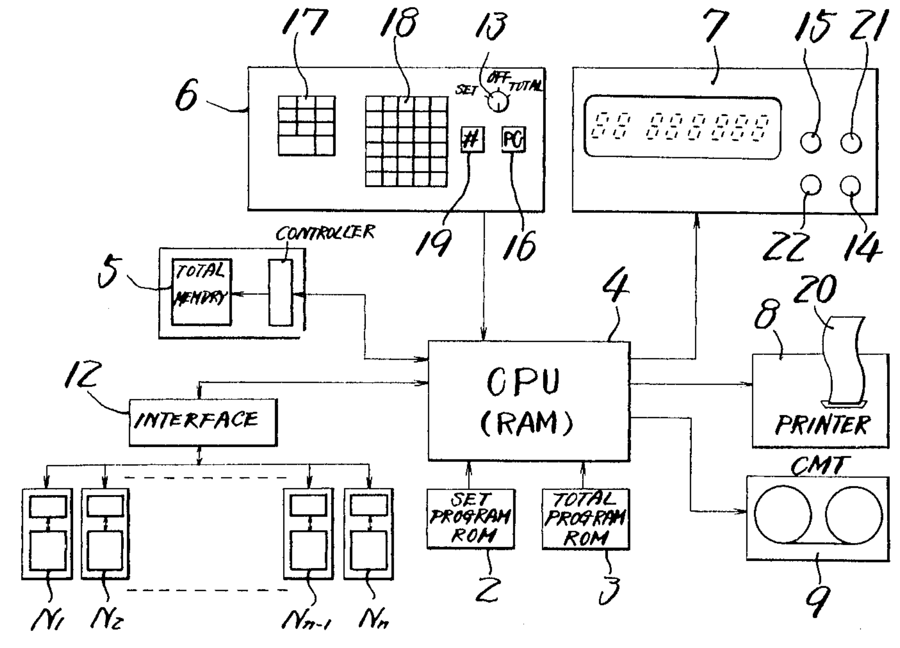
FIG. 2 is a block diagram of the device and cassettes shown in FIG. 1.

Now the present invention will be hereinafter described in detail with reference to the accompanying drawings. As shown in FIGS. 1 and 2, a plurality of memory cassettes $N_1$, $N_2$, . . . , $N_n$ are connected to a unit-price writing and sales-totalling device 1. Each of these memory cassettes $N_1$, $N_2$, . . . , $N_n$ is formed of a unit-price setting section A and a sales data section B composed of a sales volume section $B_1$ and a sale proceeds section $B_2$, each section being adapted to indicate the data in the form of digits. Besides, in each cassette, some addresses are used as the commodity total memory in which the sales data are written according to the kinds of commodities, some as the memory in which the gross totals of sales, cash sale totals and the like are written, and some as the salespersons total memory where the totalled data are written according to salespersons; thus the data reduction and check may be performed very correctly. The above-mentioned unit-price writing and sales-totalling device 1 is formed integrally of a unit-price writing section and a sales-totalling section, being provided with a central processing unit (CPU) 4 having a RAM for temporarily storing the results of registration or computation. The CPU 4 has a ROM (read only memory) 2 for setting program and a ROM 3 for totalling program therein. The device 1 also has a total memory 5, a keyboard 6, an indicator or display 7, a printer 8, and a CMT (cassette-type magnetic tape memory) 9; all being connected to the CPU 4. In addition, the device 1 has, on the top of its body 10, receptacles 11 for receiving the memory cassettes $N_1$, $N_2$, . . . , $N_n$. These receptacles 11 are provided with an interface 12 for connecting the CPU 4 with the memory cassettes $N_1$, $N_2$, . . . , $N_n$. If a control key 13 forming a part of the control device of the keyboard 6 is set to the "set" or "preset" mode, the memory cassettes $N_1$, $N_2$, . . . , $N_n$ are checked for correct connection to the device 1. If the connection is incorrect, the signal "NO" is generated and thereby the error-indicating lamp 14 of the display 7 is turned on to give warning; in this case, the control key 13 is once turned off to remount the memory cassettes $N_1$, $N_2$, . . . , $N_n$, and thereafter the control key 13 is set to the "set" mode again. If, in this manner, the connection of the memory cassettes $N_1$, $N_2$, . . . , $N_n$ is found correct, the signal "YES" will be given. Then, it is detected whether the mode is of "set" or "total." If the mode is found of "set," the signal "YES" is given and thereby the setting or presetting program is set. The set-indicating lamp 15 of the display 7 is adapted to turn on at this time to inform that the setting program has been set. Thus, the memory cassettes $N_1$, $N_2$, . . . , $N_n$ are connected to the unit-price writing section of the device 1 by inserting them in the respective receptacles 11; in other words, the memory cassettes $N_1$, $N_2$, . . . , $N_n$ are thus connected to the setting-program circuit. If, then, a preset-clear key 16 forming a part of the control device of the keyboard 6 is depressed, the contents of the unit-price setting section A of each of the memory cassettes $N_1$, $N_2$, . . . , $N_n$ are all cleared. Then, ten quantity keys 17 on the keyboard 6 are depressed according to the value of the unit price of a commodity of interest and, as a result, the results of registration are shown on the display 7. Then the commodity key 18 corresponding to the above-mentioned commodity is depressed and thereby the unit price of the commodity is written in the unit-price setting section A of each of the memory cassettes $N_1$, $N_2$, . . . , $N_n$; the commodity code and unit price being displayed on the display 8 and printed by the printer 8. The procedure to depress the ten quantity keys 17 and the commodity key 18 is repeatedly performed for each commodity; thus the unit-prices of commodities are preset in the unit-price setting section A of each of the memory cassettes $N_1$, $N_2$, . . . , $N_n$ in the order of address. When the setting or presetting operation is thus completed, the "#" key 19 forming a part of the control device in the keyboard 6 is depressed to print the "end" mark by the printer 8 and to issue a detail paper 20 having a record of preset unit prices. Finally the control key 13 is turned off to release the "set" condition of the setting program.

Figure 3:
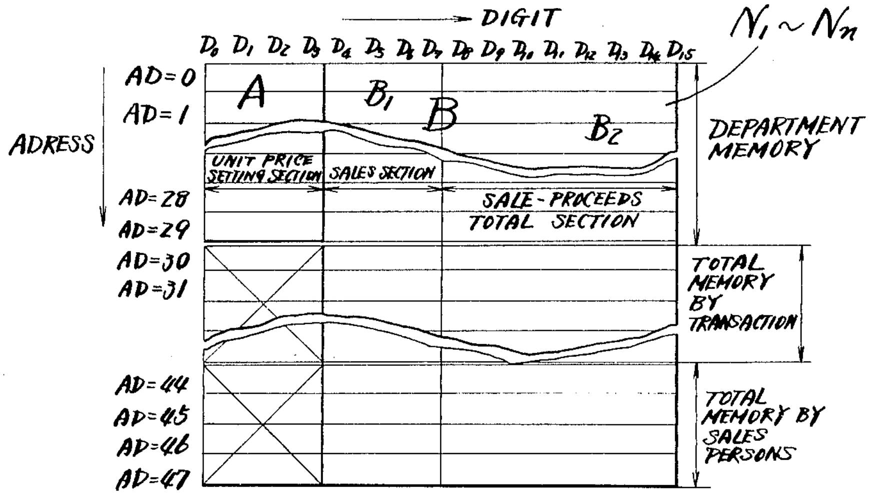
FIG. 3 is an explanatory view of the contents of the memory cassette according to the present invention.
Figure 5:
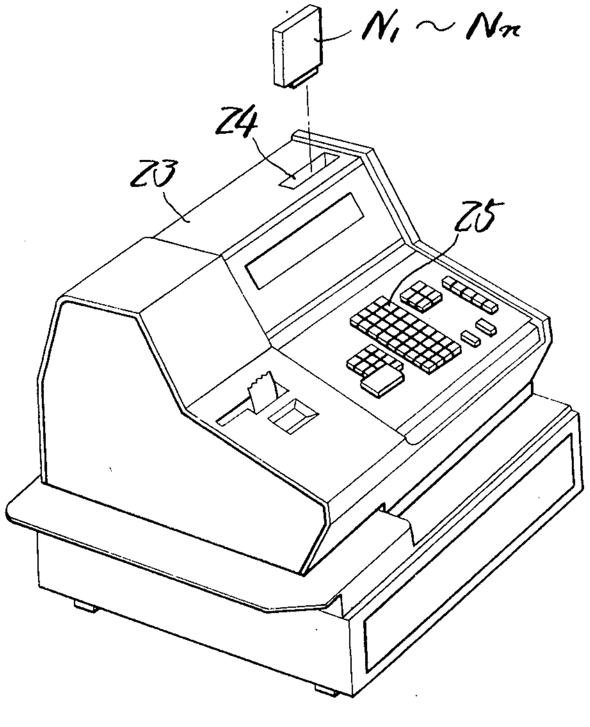
FIG. 5 is a perspective view of an electronic cash register and a memory cassette, showing how the memory cassette is mounted on the cash register to perform registration operations.
Figure 4A:
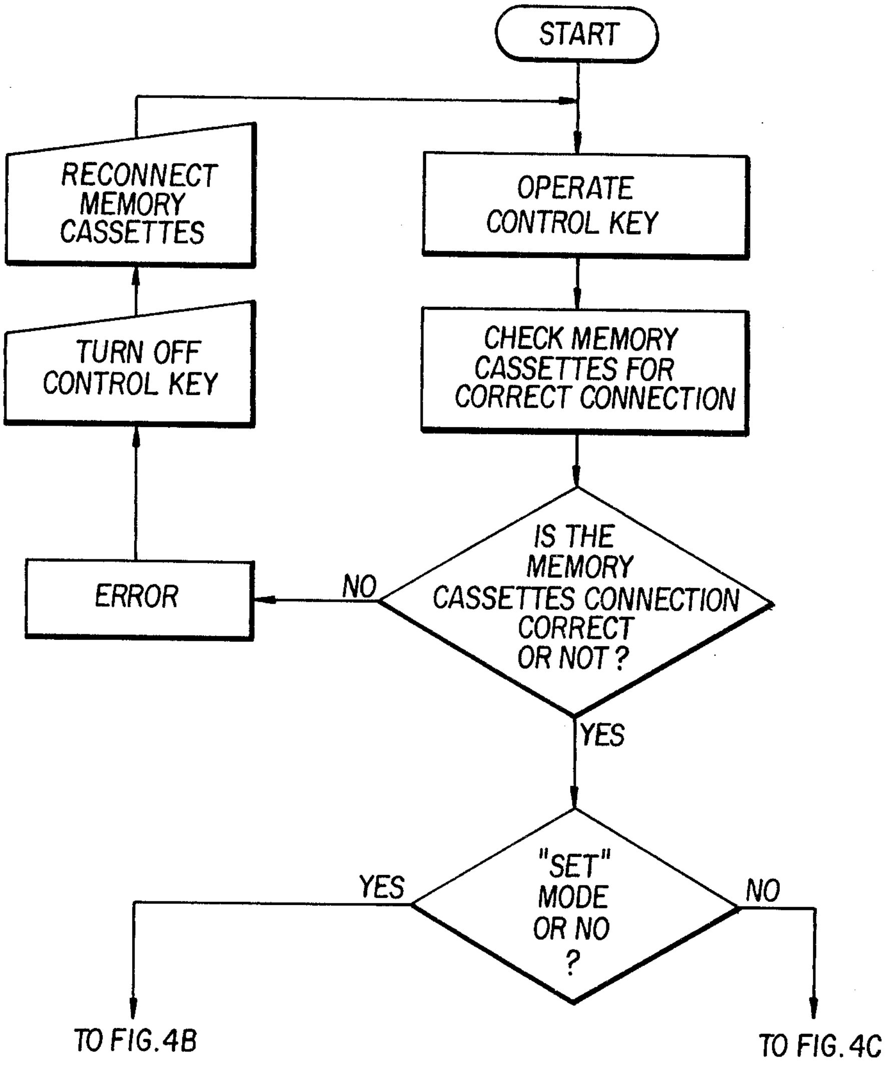
FIGS. 4A to 4C are a flowchart showing the processes of unit-price writing and sales totalling operations according to the present invention.
Figure 4B:
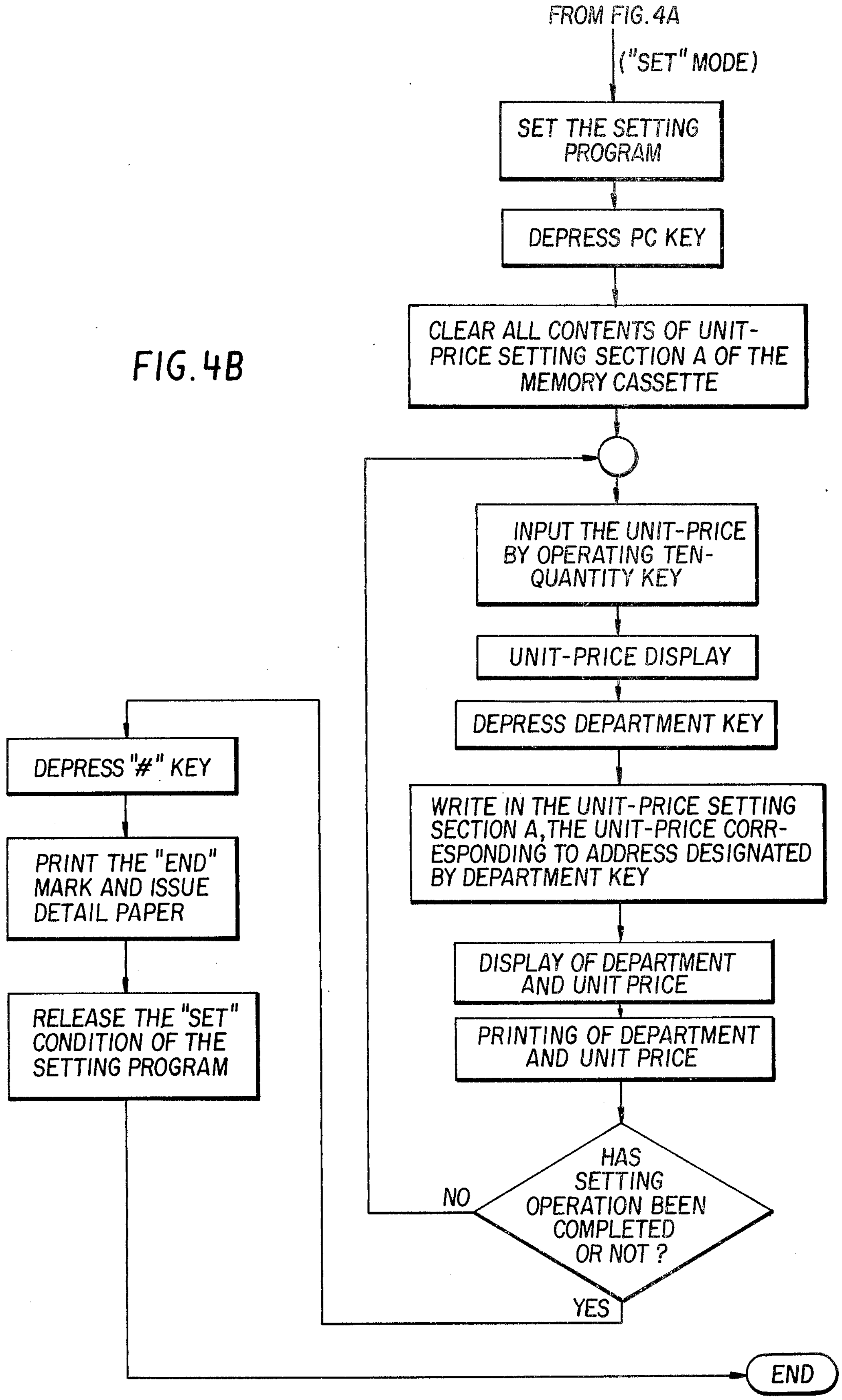
Figure 4C:
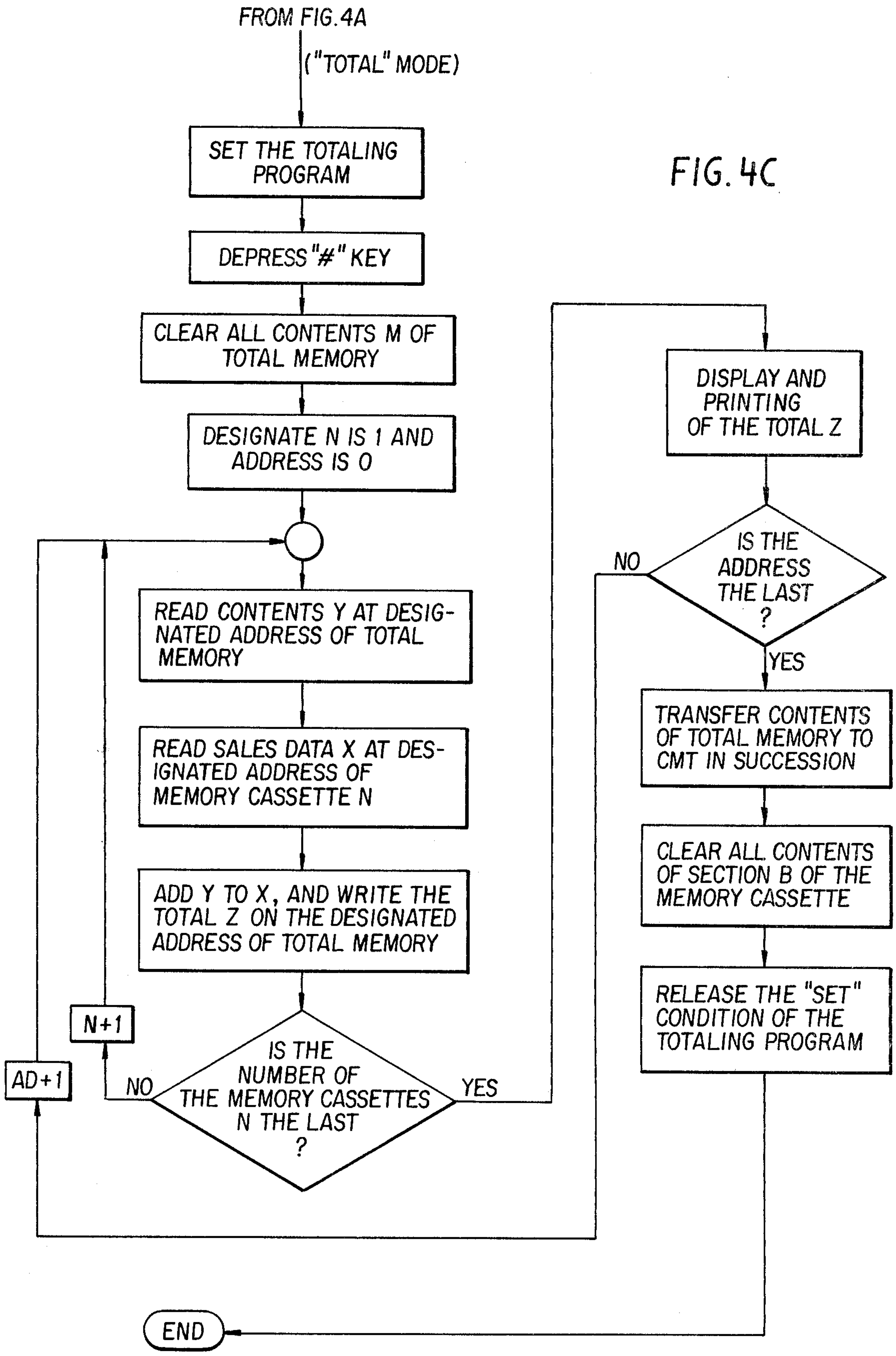

In this manner, the unit price of a commodity can be preset in a plurality of memory cassettes $N_1$, $N_2$, . . . , $N_n$ through one presetting operation. If, as shown in FIG. 5, the memory cassettes $N_1$, $N_2$, . . . , $N_n$ are inserted in the receptacles 24 of a plurality of other electronic cash registers 23, respectively, they are automatically connected to the respective CPU (not shown); therefore the troublesome presetting operation for each electronic cash register 23 can be eliminated. In addition, the electronic cash register 23 with no presetting and unit-price-memory mechanisms may be given the unit-price memory function by connecting it with the memory cassettes $N_1$, $N_2$, . . . , $N_n$. As in the case of the conventional preset electronic cash register, each cash register 23 may be operated as follows: that is, each time when a commodity or commodities have been sold, only the commodity or department key or keys 25 are depressed to read the commodity unit prices out of the unit-price setting sections A of the memory cassettes $N_1$, $N_2$, . . . , $N_n$; then computation is carried out by an arithmetic unit in the body of the electronic register; and the results of the computation, i.e., the sales volume and sale proceeds are written in the sales data section B of each of the memory cassettes $N_1$, $N_2$, . . . , $N_n$ according to the kinds of commodities, in other words, according to addresses, as shown in FIG. 3. Therefore, the sales data written in the sales data section B of each of the memory cassettes $N_1$, $N_2$, . . . , $N_n$ vary with the cash register. In registration operations, totals classified by transactions, for instance, grand total, cash sale total, gross sales total and void total in addition to totals classified by sales persons are computed, which may be written in the sales data section B of each of the memory cassettes $N_1$, $N_2$, . . . , $N_n$ in the order of address by designating the address for each of the above total data.

Figure 6:
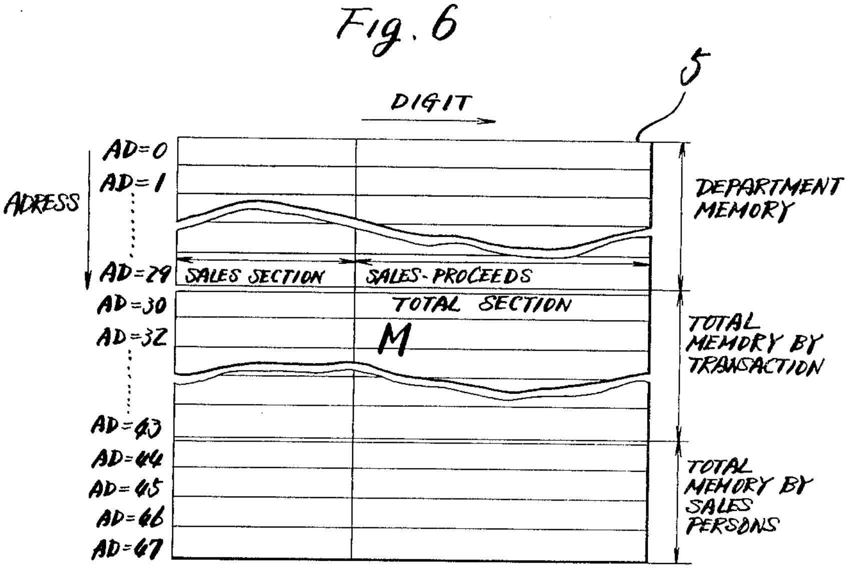
FIG. 6 is an explanatory view of the contents of the total memory.

The process for totalling the sale proceeds recorded at the respective electronic cash registers 23 is performed in the following manner:

The memory cassettes $N_1$, $N_2$, . . . , $N_n$ are removed from the electronic cash registers 23, respectively, and then are connected to the interface 12 of the unit-price-writing and sales-totalling device 1 in the same manner as in the case of the setting or presetting process. Then the control key 13 is set to the "total" mode. When the connection of each of the memory cassettes $N_1$, $N_2$, . . . , $N_n$ is found correct, it is detected whether the mode is of the set or no. If the mode is found of the "total," the signal "NO" is given and thereby the totalling program is set; in other words, the memory cassettes $N_1$, $N_2$, . . . , $N_n$ are connected to the totalling section of the device 1 or to the totalling-program circuit. At this time, the totalization lamp 21 of the display 7 is turned on. Then the "#" key 19 is depressed to clear the data stored in the total memory 5. Then, it is designated that the number of the cassette N is 1 and the address is 0. Simultaneously, the contents Y at the address 0 of the total memory 5 is read out; the value of Y being 0 immediately after the total memory is cleared. Then the sales data X at the address 0 of the memory cassette $N_1$ is read out. The results of the addition of Y and X are written in the sale-proceeds total section M at the address 0 of the total memory 5 shown in FIG. 6; in other words, the sales data of the commodity corresponding to the address 0 of the memory cassette $N_1$ are written in the total memory 5. At this time, the number of the memory cassette N is detected, and the signal "NO" is given to add 1 to the number of the memory cassette N until it reaches "n." The sales data at the address 0 of the memory cassettes $N_1, N_2, \ldots, N_n$ are thus added up one by one, and the resultant total Z is written in the total memory 5. When the number of the memory cassette N is found to be "n," the signal "YES" is given and thereby the value of the total Z is indicated on the display 7 and at the same time is printed by the printer 8. The sales data of the memory cassettes $N_1, N_2, \ldots, N_n$ are totalled for each address; that is, if the address is found not final, the above procedure is repeatedly performed while adding 1 to the previous address. When the address is found to be the last, the signal "YES" is given and thereby the resultant contents of the total memory 5 are transferred to the CMT 9. At this time, the CMT lamp 22 of the display 7 is turned on. Then the data stored in the sales data section B of each of the memory cassettes $N_1, N_2, \ldots, N_n$ are all cleared. Finally, the control key 13 is turned off to release the "set" condition of the totalling program.

According to the present invention, as mentioned above, the sales data in the electronic cash registers 23 in which sales have been registered are transferred to the memory cassettes $N_1, N_2, \ldots, N_n$, respectively; the sales data stored in the memory cassettes $N_1, N_2, \ldots, N_n$ can be totalled at a time rapidly and with ease.

In the above example, the sales data section B of each of the memory cassettes $N_1, N_2, \ldots, N_n$ is shown as consisting of the sales volume section $B_1$ and the sale-proceeds total section $B_2$; however, it may be formed of either of the two sections $B_1$ and $B_2$.

Figure 7:
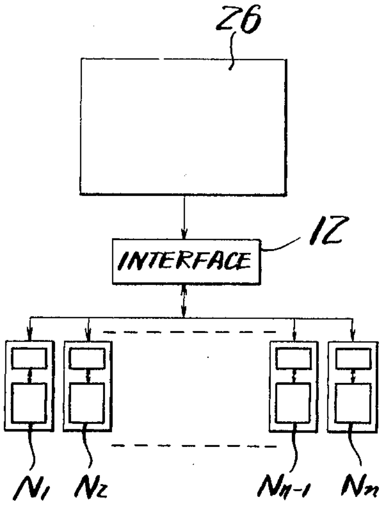
FIG. 7 is a block diagram showing how the separately-installed data-totalizer collects sales data.

In the above example, the unit-price writing section and the totalling section are shown as incorporated into the body 10 of the device 1; however, the two sections may be provided independently of each other. As shown in FIG. 7, for instance, the sales data in the memory cassettes $N_1, N_2, \ldots, N_n$ may be totalled by the use of a totalling device 26 having at least an ROM 3 for the totalling program, CPU 4, total memory 5, and an interface 12.

In the above example, the totalled data are shown as recorded in the CMT 9, but may be recorded in any one of the memory cassettes $N_1, N_2, \ldots, N_n$.

In the above example, description is made on the case where the unit prices of commodities are preset in each memory cassettes $N_1, N_2, \ldots, N_n$ in the order of address. However, they may be preset not in the order of address but at random, if the commodities are stable in price.

As mentioned above, the system according to the present invention has the following excellent features and effects:

Since a number of commodity unit prices can be preset in a plurality of memory cassettes by one presetting operation, the frequency of the troublesome presetting operation can be reduced to a minimum; memory cassettes in which unit prices are preset are mounted on the respective electronic cash registers and thereby the cash registers having no unit-price memory mechanism can be also given the unit-price memory function and can be made compact; since the memory cassette has a unit-price setting section and a sales data section, the unit prices may be read out of the unit-price setting section to simplify the sales registration operation and the sales data may be written in the sales data section, and the grand total of the sales data may be obtained very rapidly and easily by the use of a totalling device together with the memory cassettes collected.

Obviously many modifications and variations of the present invention are possible in the light of the above teachings. It is therefore to be understood that within the scope of the appended claims the invention may be practiced otherwise than as specifically described.

What is claimed is:

1. A merchandise sales control system comprising a plurality of memory cassettes each having at least a recording section composed of a unit-price setting section and a sales data section, a unit-price writing device able to removably connect to said memory cassettes and to preset a number of commodity unit prices in the unit-price setting section of each of said memory cassettes, a plurality of electronic cash registers able to removably connect to said memory cassettes, and a totalling device able to removably connect to said memory cassettes, wherein said memory cassettes are connected to said unit-price writing device which presets a number of commodity unit prices in the unit-price setting section of said memory cassettes, then the memory cassettes are connected to said electronic cash registers respectively to perform sales registration so that sales data based on the commodity unit prices stored in said unit-price setting section are registered in said sales data section, and then said memory cassettes in which the sales data are registered are removed from said electronic cash registers and are connected to said totalling device which totals the sales data stored in said electronic cash registers.

2. The system as set forth in claim 1, wherein said unit-price writing device and said totalling device are formed independently of each other.

3. The system as set forth in claim 1, wherein said electronic cash register contains therein a unit-price setting memory so that unit-price setting data other than those stored in said memory cassettes may be stored therein to perform registration.

4. The system as set forth in claim 1, wherein totalled data are stored in at least one of a plurality of said memory cassettes to be mounted on said totalling device.

5. The system as set forth in claim 1, wherein said unit-price setting section and sales data section are provided in said memory cassette along the digits of each address.

6. The system as set forth in claim 1, wherein said unit-price writing device and totalling device are incorporated into a unit-price-writing and sales-totalling device.

7. The system as set forth in claim 6, comprising numeral keys for inputting numerical data, commodity keys for designating the classification code of a particular commodity, a CPU, memories for unit-price setting program and totalling program, said memories being selectively connected to said CPU, a control device for selecting and starting said programs, a plurality of memory cassettes removably connected to said CPU and having a recording section composed of a commodity unit-price setting section and a sales data section, and a total memory connected to said CPU and in which the totals of the sales data of said memory cassettes are stored.

8. A merchandise sales control system comprising a plurality of electronic cash registers, memory cassettes each removably mounted on each of said electronic cash registers and capable of storing sales data, and a totalling device for totalling sales data, wherein said memory cassettes, which are made to store sales data by the registration operation of said electronic cash registers, are simultaneously set in said totalling device so as to obtain total values such as gross sales total, cash sale total and the like necessary for merchandise control.

9. A merchandise sales control system comprising a plurality of memory cassettes each having at least a recording section composed of a unit-price setting section and a sales data section, a unit-price writing device able to removably connect to said memory cassettes and to preset a number of commodity unit prices in the unit-price setting section of each of said memory cassettes, a plurality of memoryless electronic cash registers able to removably connect to said memory cassettes, and a totalling device able to removably connect to said memory cassettes, wherein said memory cassettes are connected to said unit-price writing device which presets a number of commodity unit prices in the unit-price setting section of said memory cassettes, then the memory cassettes are connected to said electronic cash registers respectively to perform sales registration so that sales data based on the commodity unit prices stored in said unit-price setting section are registered in said sales data section, and then said memory cassettes in which the sales data are registered are removed from said electronic cash registers and are connected to said totalling device which totals the sales data stored in said electronic cash registers.

10. A merchandise sales control system comprising a plurality of memory cassettes each having at least a recording section composed of a unit-price setting section and a sales data section, a unit-price writing device able to removably connect to said memory cassettes to preset only newly changed commodity unit prices in the unit-price setting section of each of said memory cassettes, a plurality of electronic cash registers able to removably connect to said memory cassettes, and a totalling device able to removably connect to said memory cassettes, wherein said memory cassettes are connected to said unit-price writing device which presets a number of newly changed commodity unit prices in the unit-price setting section of said memory cassettes, then the memory cassettes are connected to said electronic cash registers respectively to perform sales registration so that sales data based on the commodity unit prices stored in said unit-price setting section are registered in said sales data section, and then said memory cassettes in which the sales data are registered are removed from said electronic cash registers and are connected to said totalling device which totals the sales data stored in said electronic cash registers.

* * * * *